United States Patent [19]
Sala et al.

[11] Patent Number: 5,178,838
[45] Date of Patent: Jan. 12, 1993

[54] CHEMICAL REAGENT VIAL

[75] Inventors: Nello Sala, Mi; Gilberto Passerini, Milan; Mario Buelli, Milan; Davide Conti, Milan; Rosario D. Lorenzo, Milan; Ivo Secondini, Milan; Simona Bravi, Milan, all of Italy

[73] Assignee: Farmitalia Carlo Erba S. R. L., Milan, Italy

[21] Appl. No.: 732,913

[22] Filed: Jul. 19, 1991

[30] Foreign Application Priority Data

Jul. 27, 1990 [IT] Italy .............................. 21568/90[U]

[51] Int. Cl.⁵ ................................................ B01L 3/00
[52] U.S. Cl. .................................... 422/102; 422/100; 422/103; 435/296; 436/180
[58] Field of Search ................ 422/102, 99, 100, 101, 422/103; 435/296; 222/552, 91; 220/231, 277, 267, 360; 215/257, 228; 436/180

[56] References Cited

U.S. PATENT DOCUMENTS

| | | | |
|---|---|---|---|
| 3,875,012 | 4/1975 | Dorn et al. | 215/DIG. 3 |
| 4,342,724 | 8/1982 | Narra | 422/101 |
| 4,346,613 | 8/1982 | Turner et al. | 3/864.51 |
| 4,353,868 | 10/1982 | Joslin et al. | 422/101 |
| 4,723,687 | 2/1988 | Kutterer | 222/83 |

FOREIGN PATENT DOCUMENTS 842178  6/1939  France .

Primary Examiner—Jill A. Johnston
Assistant Examiner—Long V. Le
Attorney, Agent, or Firm—Oblon, Spivak, McClelland, Maier & Neustadt

[57] ABSTRACT

A chemical reagent vial has an elongated shape from the end portions of which extend two lugs, one of which is closed by a frangible membrane which can be broken by a projection of a funnel element which can be screw engaged on a set lug. The other lug having an outer surface at least a portion of which is conical and on which tightly abuts a conical surface of a hollow sleeve which, moreover, tightly engages with a thread of the lug thereon the sleeve is threaded, through the lug at least an outlet hole being formed, which is arranged between the two sealing regions of the sleeve on the lug.

3 Claims, 1 Drawing Sheet

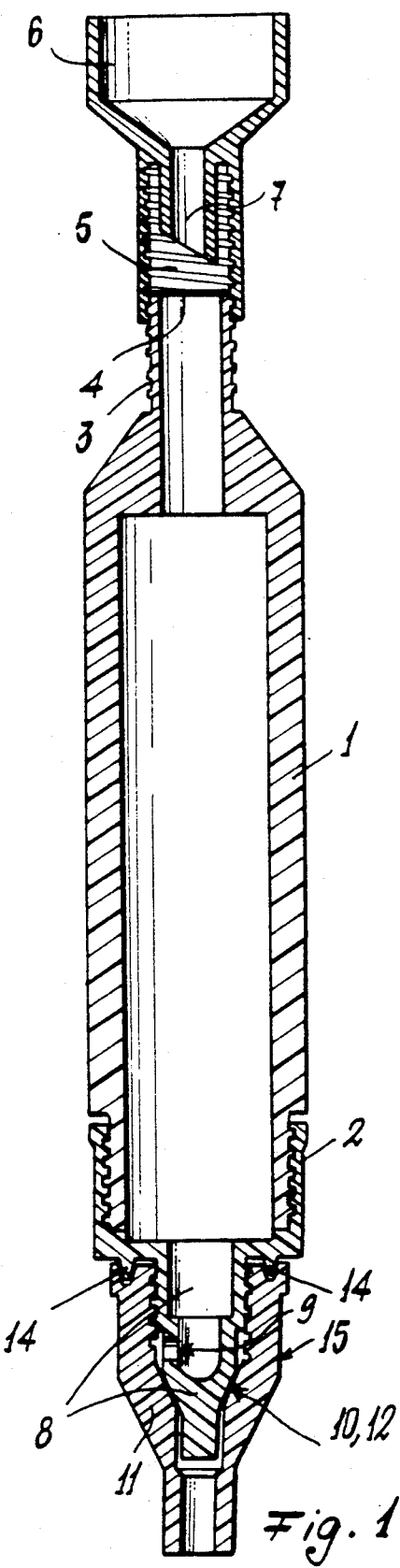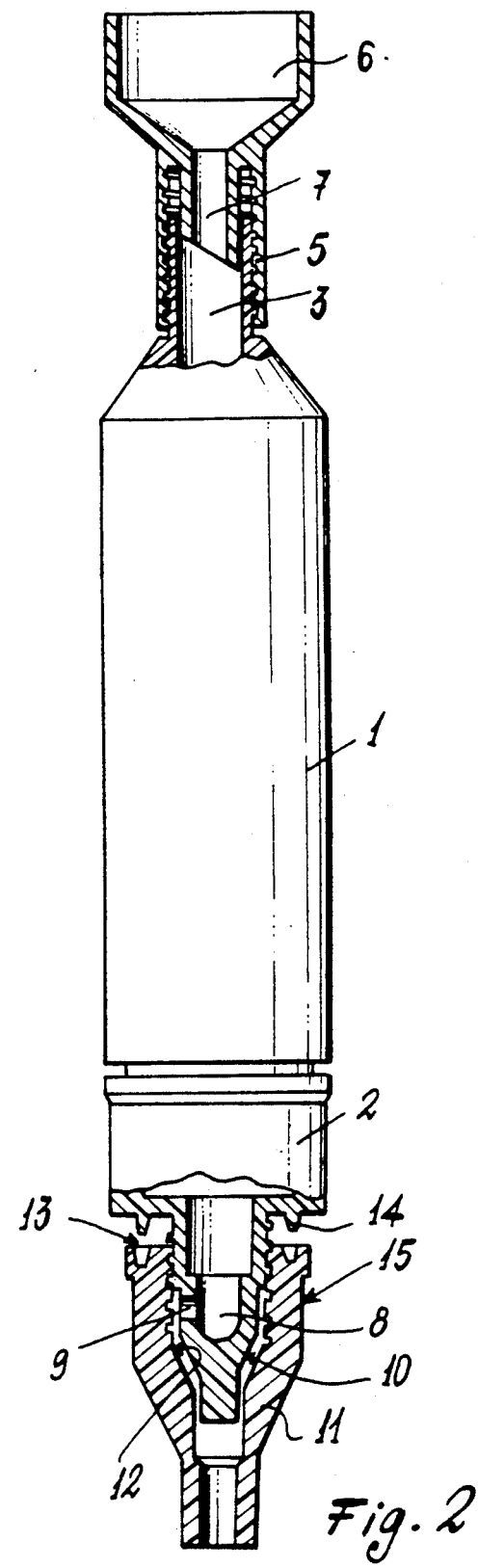

CHEMICAL REAGENT VIAL

BACKGROUND OF THE INVENTION

The present invention relates to a chemical reagent vial and, more specifically, a vial provided for holding metered amounts of chemical reagents having a high purity or a well defined strength, to be used for carrying out chemical reactions and/or titrations after dilution to a preset concentration.

As is known, in order to carry out a lot of chemical reactions, e.g. in chemical laboratories, reagents must be used having an accurately controlled concentration or strength: many reagents are classified as toxic and/or corrosive (i.e. sulphuric acid) and must be held in tightly closed vessels adapted to prevent the reagent from leaking and to preserve it unaltered in the time.

For laboratory use, is also known to hold accurately metered high purity or well defined titre reagent amounts within vials made of unbreakable materials (usually a plastic material) which vials or tubes have an elongated shape and two opposite open ends which are tightly closed by two frangible or pierceable elements or membranes, heat sealed on the two openings. In order to use the reagent, the vial is arranged above the mouth of a vessel or flask, and then the two above mentioned pierceable membranes are perforated or broken by a long and thin glass or stainless steel rod: then, by means of a small funnel engaged in one of the openings of the vial, a precisely metered water amount is poured into the vial (this water exiting the other opening of the vial so as to wash it and fall into the flask) in order to dilute the reagent to the titre suitable for the provided reagent use. These vials have a very simple construction, but, as the reagents have a toxic or corrosive nature, the handling and use thereof can involve hazards.

In order to overcome the above problem, vials have been designed, and also provided with an elongated shape, and hollow lugs projecting at the two open ends of each vial, where there are arranged the membranes for closing said openings: on one of said lugs (the upward turned lug) there is assembled a small funnel having a projecting tip which is brought into contact with the adjoining membrane so as to break or perforate the latter as the reagent must be used. After having poured the reagent into the flask, the funnel is properly engaged on the related lug and, through said funnel a desired diluting water amount can be poured into the vial and accordingly into the flask.

This construction, however, has the drawback that the tip projecting from the funnel greatly obstructs the diluting water flow being poured into the funnel, and that the funnel must be turned upside down after having perforated the membrane.

On the other lug (that is the lug which in use is downward turned) of the vial there is screw engaged a perforated cap, therefrom an element projects the free end whereof is made rigid with the membrane heat sealed on the end portion of said lug: as the cap is turned in the disengaging direction from its lug, said element pulls the membrane so as to tear it and allow the reagent to be ejected through the holes of the cap (after having broken, as it should be apparent, the bottom membrane of the vial). As it should be apparent, this construction is complex and difficult to make.

SUMMARY OF THE INVENTION

Accordingly, the main object of the present invention is to provide a vial for chemical reagents which can be made in a simple and un-expensive way, is reliable in operation and allows a reagent to be easily poured into a flask while allowing an easy addition of water to the reagent, through a funnel element firmly engaged with the vial.

The above and yet other objects are achieved by an elongated vial having two opposite ends from which two hollow lugs project, one of said lugs being tightly closed by a membrane tightly applied on a free end portion of said lug, wherein on said lug closed by said membrane there is screw engaged a cylidrnical body having an enlarged free end portion away from said vial and provided with a funnel configuration at a central portion of which there is formed a hole at and about which a tubular element extends having a free edge facing and near said membrane, and having a cut-edge contour. The tubular element having an outer diameter adapted to allow said tubular element to engage in a cavity of a lug adjoining said tubular element, as said body is fully screw engaged on said lug. The other of said hollow lugs having an elongated shape closed at a free end thereof and through said other lug there being formed at least a hole near which hole, at a position near the free end of said lug, an outer surface of said lug has a substantially conical shape. On said other lug there being tightly screw engaged a hollow sleeve, said hollow sleeve having an inner surface, a portion of which has a conical shape and tightly abuts on the conical surface of said lug as said sleeve is fully screw-engaged on said lug.

Preferably, the free edge of the sleeve facing the vial is adapted to tightly engage, as the sleeve is fully threaded on the lug, with a corresponding contoured edge provided on the adjoining end of the vial.

BRIEF DESCRIPTION OF THE DRAWINGS

In order to better understand the construction and features of the vial according to the present invention, a preferred embodiment thereof will be hereinafter disclosed with reference to the accompanying drawings where:

FIG. 1 is a longitudinal cross-sectional view of the vial, represented in a tightly closed condition; and FIG. 2 is a partially cross-sectioned view of the vial in its fully open condition.

DESCRIPTION OF THE PREFERRED EMBODIMENT

The vial shown in the drawings, which is wholly made of a plastic material, comprises two hollow central bodies 1 and 2 which are firmly tightly screw engaged onto one another. From the body 1 a hollow lug 3 projects, having an outer thread, and on the free end portion of said lug there is heat sealed a closing membrane 4 (FIG. 1).

On the lug 3 there is partially threaded (as shown in FIG. 1) a cylindrical body 5 the free end 6 of which projecting from the lug is enlarged and has a funnel configuration. At the central portion of the funnel there is provided a hole near and about which a tubular element 7 projects, the free edge of said tubular element facing and near said membrane 4 being undercut so as to provide a cutting edge.

From the body 2 a further elongated hollow lug 8 projects, which has a closed free end, a hole 9 being provided through the cavity of said lug.

Under the hole 9 (as shown in the figures), the outer surface of the lug 8 has a conical portion 10 (FIG. 2).

On the lug 8 there is engaged a hollow sleeve 11 which is coupled to this lug by cooperating threads adapted to provide a tight connection so as to prevent liquids from leaking through the engagement portions of the threads.

As shown in the drawing, a portion 12 of the inner surface of the sleeve 11 has a conical shape so that, as the sleeve 11 is fully thread engaged on its related lug, the conical surfaces 10, 12 will contact one another (FIG. 1) thereby providing a perfect tightness connection.

From the drawing it should be apparent that on the free edge of the sleeve 11 facing the body 2 there is provided an annular groove 13 at which there is provided an annular edge 14 projecting from the body 2: as the sleeve 11 is fully screwed on the lug 8, the annular edge 14 will enter and will be pressed in the annular groove 13 (FIG. 1) thereby contributing to the achieving of a perfect tightness. Thus, supposing that the cavities of the bodies 1 and 2 are filled by a reagent, the latter will pass through the hole 9 but, as the sleeve 11 is fully screw engaged on the lug 8, the reagent will be prevented from leaking from or exiting the vial since the two cooperating surfaces 10 and 12 and respectively the threads of the sleeve and lug, as well as the firm engagement of the rib 14 in the groove 13 of the sleeve, will provide a perfect tightness.

Of course, the coupling threads of the bodies 1 and 2 and respectively of the sleeve 11 and lug 8 will have an opposite direction in order to prevent the body 2 from disengaging from the body 1 as the sleeve 11 is disengaged from the lug 8.

It should be moreover pointed out that a portion 15 of the outer surface of the sleeve 11 has an hexagonal contour in order to be easily gripped by a tool or a hand.

As shown in FIG. 1, a reagent held in the vial will be tightly restrained therein, without any risks of leakages or deteriorations.

For pouring the reagent into a flask the following operations must be performed. By holding with one hand the vial in an upright condition (as shown in the drawings), with the open end of the sleeve 11 above the flask mouth, the body 5, 6 is thread engaged on the threaded lug 3, so as to bring the cutting edge of the tubular element 7 to contact the membrane 4, to precisely cut the latter, which will be aided by the turning movement of the cutting edge of the element 7 with respect to the membrane 4. By continuing the turning movement of the body 5, 6 with respect to the body 1, 2, the tubular element 7 will enter the cavity of the lug 3, as shown in FIG. 2.

Consider now the bottom portion of the vial. By holding with one hand the body 1, 2 at an upright position, by a tool or the fingers, the hexagonal portion 15 of the sleeve 11 is gripped and said sleeve is disengaged from the lug 8: thus the conical surface 12 is moved away from the conical surface 10 and the reagent will freely flow into the flask through the hole 9, the free space between the conical walls 10 and 12 and the free cavity of the sleeve.

At this time, a desired water amount can be poured into the funnel 6, this water freely flowing from the funnel to exit the open free end of the sleeve 11, as it should be apparent from FIG. 2.

We claim:

1. An elongated vial having two opposite ends from which a first hollow lug and a second hollow lug project, said first lug being closed by a membrane sealingly applied on a free end portion of said first lug, wherein on said first lug there is screw engaging a cylindrical body having an enlarged free end portion extending away from said vial and provided with a funnel configuration at a central portion thereof, said central portion having a hole formed therethrough from which a tubular element extends, said element having a free edge facing and adjacent to said membrane, and having a cut-edge contour, said tubular element having an outer diameter which allows said tubular element to extend into said first lug as said body is fully screw engaged on said first lug, said second hollow lug having an elongated shape having an outer peripheral end and an inner free end and being closed at said free end thereof, said second lug having at least one hole formed therethrough at a position adjacent the free end of said second lug, an outer surface of said free end of said second lug having a substantially conical shape, said conical surface being further extended adjacent the outer peripheral end of said second lug, a hollow sleeve being threadedly engaged on said second lug, said hollow sleeve having an inner surface which comprises a first portion having a conical shape which sealingly abuts on said conical surface of said second lug, and a second portion having a surface which abuts said outer peripheral end as said sleeve is fully screw-engaged on said lug.

2. A vial according to claim 1, wherein said second portion of said hollow sleeve which faces said outer peripheral and of said vial from which said second hollow lug projects comprises first engaging means which engages second engaging means located on said outer peripheral end of said vial from which said hollow lug projects.

3. The vial according to claim 2, wherein said first engaging means on said hollow sleeve comprises annular groove means and said second engaging means of said vial comprises a projecting portion which cooperates with said annular groove means.

* * * * *